(12) United States Patent
Lee et al.

(10) Patent No.: US 7,501,039 B2
(45) Date of Patent: Mar. 10, 2009

(54) GAS ASSISTED BONDING OF POLYMERS AND POLYMER COMPOSITES

(75) Inventors: L. James Lee, Columbus, OH (US); David Lane Tomasko, Columbus, OH (US); Yong Yang, Columbus, OH (US); Changchun Zeng, Salt Lake City, UT (US)

(73) Assignee: The Ohio State University, Columbus, OH (US)

( * ) Notice: Subject to any disclaimer, the term of this patent is extended or adjusted under 35 U.S.C. 154(b) by 270 days.

(21) Appl. No.: 11/155,808

(22) Filed: Jun. 17, 2005

(65) Prior Publication Data
US 2006/0016556 A1 Jan. 26, 2006

Related U.S. Application Data

(60) Provisional application No. 60/580,544, filed on Jun. 17, 2004.

(51) Int. Cl.
*C09J 5/02* (2006.01)
*B32B 37/00* (2006.01)

(52) U.S. Cl. ................. 156/308.6; 156/305; 156/308.2
(58) Field of Classification Search ................. 156/305, 156/308.2, 308.6, 308.8
See application file for complete search history.

(56) References Cited

U.S. PATENT DOCUMENTS 2,212,694 A * 8/1940 McMurray .................. 392/476
4,970,110 A * 11/1990 Miraldi ..................... 427/389.9
5,030,385 A * 7/1991 Bartlett ........................ 252/392
5,326,584 A * 7/1994 Kamel et al. ................. 427/491
6,838,156 B1 * 1/2005 Neyer et al. .................. 428/172
2002/0144774 A1* 10/2002 McReynolds ............... 156/285
2002/0195196 A1* 12/2002 Peters et al. .............. 156/308.6
2004/0231791 A1* 11/2004 Norling et al. ........... 156/307.5

OTHER PUBLICATIONS

WO 01/21384 Neyer et al. Mar. 2001.*
American Heritage Dictionary Definition of "vessel" 2000.*
McGraw-Hill Dictionary of Scientific and Technical Terms definition of "pressure vessel" —date unknown as provided from answers.com.*
Yang, Yong et al., "Fabrication of well-defined PLGA scaffolds using novel microembossing and carbon dioxide bonding," Biomaterials 26 (2005) pp. 2585-2595.
Yang, Yong et al., "Three-Dimensional Assembly of Polymer Micro-/Nanostructures at Low Temperatures," Adv. Mater. 2004, 16, No. 6, Mar. 18, pp. 560-564.
Yang, Yong et al., Abstract: "Low Temperature Fusion of Polymeric Nanostructures Using Carbon Dioxide," pp. 1-16, no date/date unknown.
Yang, Yong et al., Gas Enhanced Interfacial Bonding of Polymers at the Micro/Nanoscale, AICHE Annual Meeting, Paper 269d, Nov. 2003, pp. 20.

* cited by examiner

*Primary Examiner*—John L Goff
(74) *Attorney, Agent, or Firm*—Dinsmore & Shohl LLP

(57) ABSTRACT

A method of bonding materials. The method comprises providing a polymer; providing a second material; contacting the polymer and the second material at a low contact pressure in the absence of a solvent or an adhesive; maintaining the polymer at a temperature less than a bulk Tg of the polymer; introducing a gas at low pressure; and bonding the polymer and the second material.

17 Claims, 10 Drawing Sheets

GAS ASSISTED BONDING OF POLYMERS AND POLYMER COMPOSITES

This application claims the benefit of provisional application Ser. No. 60/580,544, entitled Supercritical Fluid Assisted Processing and Bonding of Polymers and Polymer Composites, filed Jun. 17, 2004.

BACKGROUND OF THE INVENTION

The present invention relates generally to the processing and bonding of polymer materials, and more particularly to the use of gas for the processing and bonding of polymer materials and polymer composite materials.

Polymer-based biomedical micro-/nanodevices containing environmentally sensitive biomolecules are attracting increased interest. The ability to assemble these devices at low temperatures in order to minimize denaturing is an important consideration. For instance, micro-arrays and microfluidic biochips need to be sealed with a lid, and the construction of three-dimensional tissue engineering scaffolds requires bonding of multiple two-dimensional layers with micro-/nanosized patterns. Processing and bonding of plastic materials usually require the use of either a temperature above the glass transition temperature ($T_g$) of the polymer substrates or organic solvents to deform solid materials so they can be molded into specific shapes or bond the material. For many applications, particularly biomedical products, high temperature and organic solvents may lead to denaturing of biomolecules. Residue of organic solvents is also a severe contamination. In micro- and nanoscale processing, applying heat and solvent alone may not be enough to guarantee high dimensional accuracy during fabrication of micro- or nanoscale features. In addition, heat and solvents tend to deform micro-/nanostructures.

During bonding, polymer interfaces undergo interfacial wetting, diffusion, and randomization stages. Diffusion of polymer chain segments across the interfaces and randomization of polymer chain segments determine the development of bond strength. Bonding of polymers at temperatures below their bulk $T_g$ has been studied by several researchers. For example, polystyrene (PS) was bonded at $T_g$ −41° C. or 62° C. and poly(2,6-dimethyl 1,4-phenylene oxide) (PPO) was bonded at $T_g$ −126° C. or 90° C. using 100 μm thick polymer films. It was believed that this low temperature interfacial bonding resulted from the $T_g$ depression in the proximity of polymer surfaces. Experimental observations of polymer thin films have shown that glass transition temperatures near the polymer surface differ from those in the bulk. The competition between the polymer-free surface and the polymer-substrate interactions determines this thickness-dependent $T_g$ shift. When the polymer-free surface interaction dominates, the polymer shows a $T_g$ depression with reducing thickness near the surface, typically less than 100 nm. An increase in $T_g$ is observed as the thickness decreases when a strong interaction exists between the polymer chains and the underlying substrates.

However, literature results show that bond strength develops very slowly below $T_g$. As shown in Table 1, the bond strength of PS/PS at 62° C. with a $P_C$ of 0.8 MPa is only 0.08 MPa after 4 h. Even after 24 h, the bond strength is still low, 0.14 MPa, which is unsuitable for practical applications.

Therefore, there is a need for a method of bonding materials without using high temperatures, solvents, or adhesives.

SUMMARY OF THE INVENTION

The present invention meets this need by providing a method of bonding materials. The method comprises providing a polymer; providing a second material; contacting the polymer and the second material at a low contact pressure in the absence of a solvent or an adhesive; maintaining the polymer at a temperature less than a bulk Tg of the polymer; introducing a gas at low pressure; and bonding the polymer and the second material. By polymer, we mean polymers and polymer composites.

DETAILED DESCRIPTION OF THE INVENTION

Figure 1A:
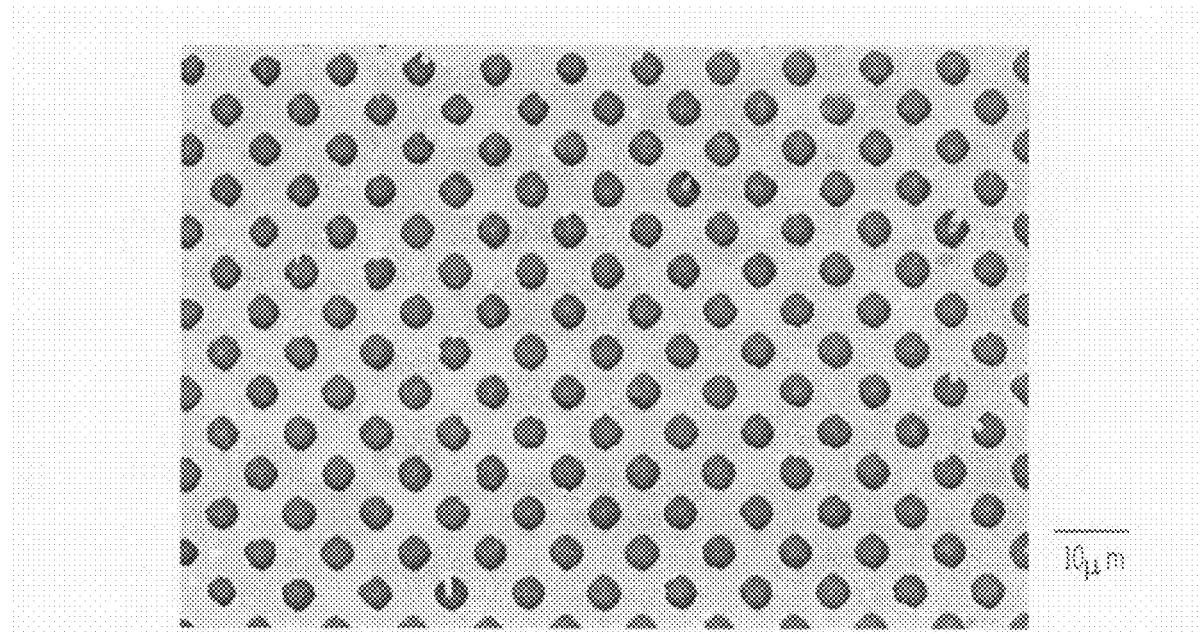
FIG. 1A is an SEM micrograph of the top view of a patterned PLGA layer.
Figure 1B:
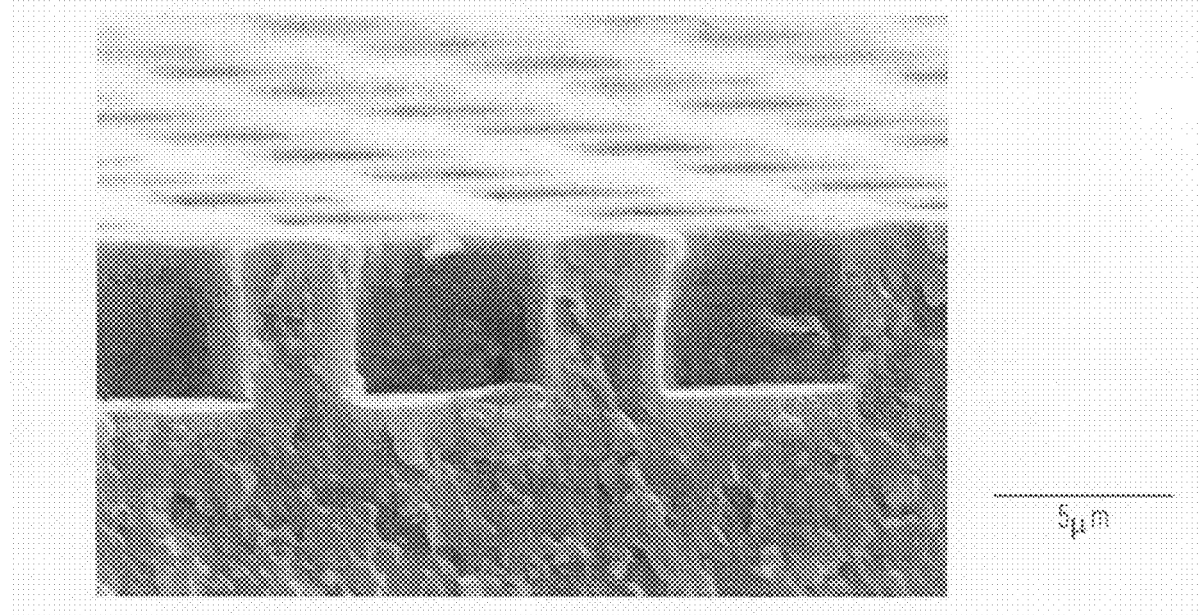
FIG. 1B is an SEM micrograph of the side view of a patterned PLGA layer.
Figure 1C:
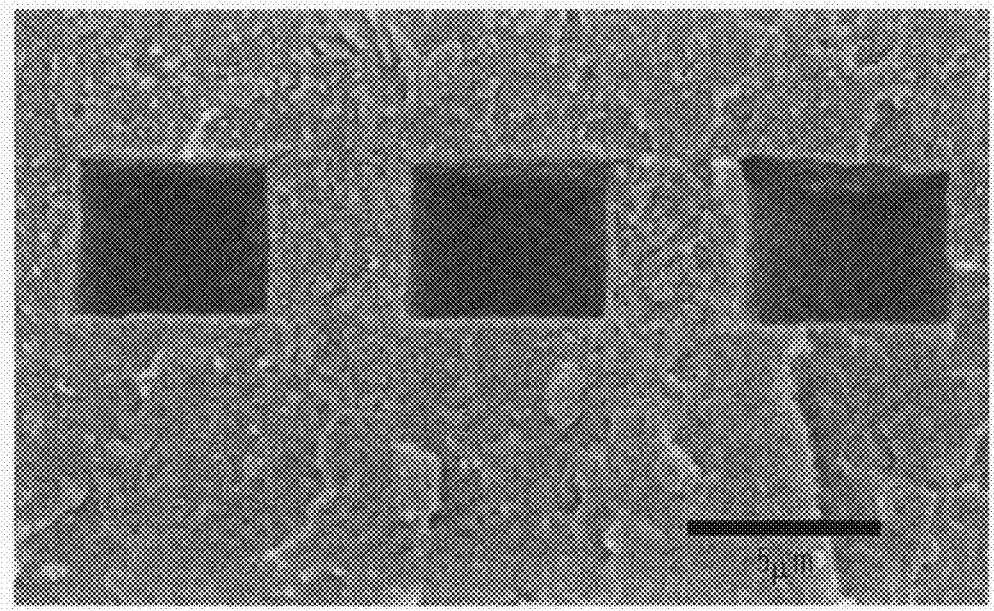
FIG. 1C is an SEM micrograph of PLGA layers bonded at 35° C. and 0.79 MPa $CO_2$ pressure.
Figure 1D:
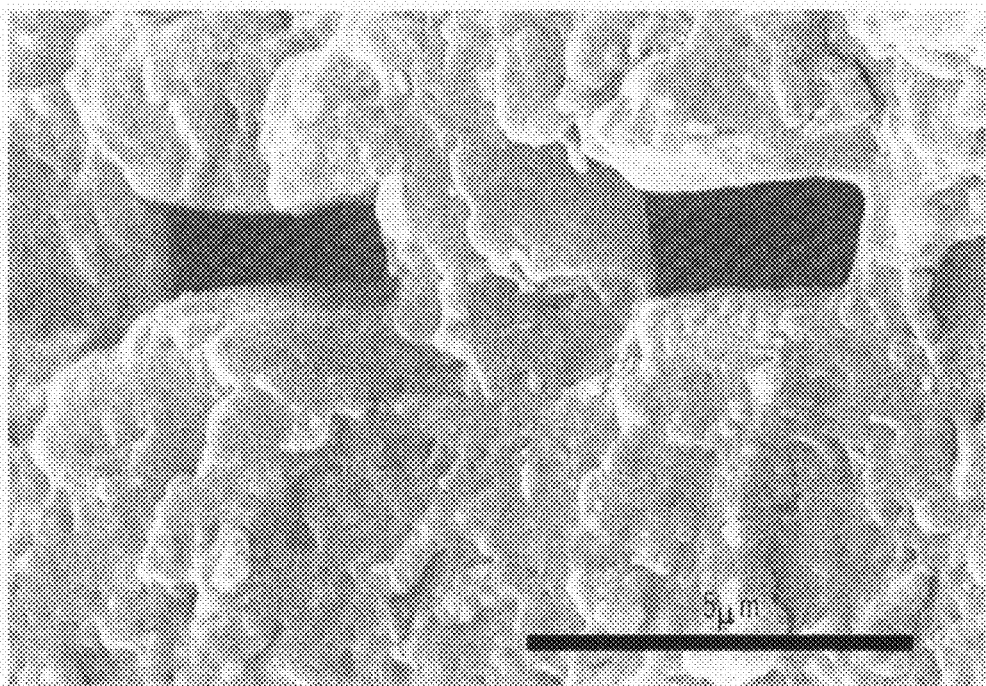
FIG. 1D is an SEM micrograph of PLGA layers bonded at 35° C. and 2.17 MPa $CO_2$ pressure.

A low-temperature, low-pressure polymer bonding technique based on gas-enhanced chain entanglement near the polymer surfaces has been developed. We have demonstrated that the use of a gas can enhance interfacial bonding of micro-/nanostructures at low temperatures without the use of solvents or adhesives. Although not wanting to be limited to theory, it is believed that the presence of $CO_2$ greatly reduces the surface $T_g$. The bond strength of poly(DL-lactide-co-glycolide) (PLGA) approached 1 MPa with a bonding time of 30 min at 35° C., 0.79 MPa absolute $CO_2$ pressure.

The layers to be bonded, whether patterned or not, are stacked and placed between two supports. Contact pressure is applied to the assembly to ensure good contact between the layers. The assembly can be placed in a pressure vessel. The gas is introduced into the pressure vessel at a predetermined temperature and pressure, which depend on the materials to be bonded. The assembly remains in the pressure vessel with the gas for a predetermined time, which depends on the materials to be bonded. The pressure is then released, and the assembly is removed from the pressure vessel.

The temperature and gas pressure are selected based on the polymer being bonded. The temperature is selected to be a temperature below the $T_g$ of the polymer at the pressure selected. Although this depends on the polymer being used, the temperature is desirably less than 70° C., less than 50° C., or less than 35° C.

The gas pressure is selected based on the polymer and the temperature to be used. The pressure is selected so that the $T_g$ of the polymer under the pressure selected is higher than the bonding temperature. Although this varies based on the polymer, it is generally, less than 10 MPa, less than 5, MPa, less than 4 MPa, less than 3 MPa, less than 2 MPa, less than 1 MPa, or less than 0.5 MPa.

The contact pressure is a function of the polymer used, as well as the temperature and pressure. It is generally less than 1 MPa, less than 0.1 MPa, or less than 0.05 MPa. A proper contact pressure helps to achieve interfacial bonding of polymer micro-/nanostructures. The contact pressure is optimized based on the balance of implementing interfacial wetting and maintaining micro-/nanostructures on polymer substrates. An insufficient contact pressure cannot achieve interfacial wetting, while excessive pressure will result in creep deformation during the bonding period and cause micro-/nanostructure deformation.

The gas assisted process can be used to bond polymers to like polymers or to different polymers. For example, poly(lactic-glycolite acid) (PLGA) can be bonded to PLGA using this method. It can also be bonded to polystyrene (PS) and polymethyl methacrylate (PMMA). Suitable polymers include, but are not limited to, PS, PMMA, polycarbonate (PC), and biodegradable polymers such as PLGA, and polylactic acid (PLA).

The process can also be used to bond polymers to non-polymeric materials. Suitable non-polymeric materials include, but are not limited to metals, silicon, and silicon oxide (usually coated with a polymer thin layer).

$CO_2$ is a desirable gas for polymer processing since it is non-toxic, nonflammable, and inexpensive. After processing, $CO_2$ removal from the polymer can be accomplished simply by depressurization of the system. We have found that carbon dioxide can serve as a good processing aid for polymers including, but not limited to, PS, PMMA, PC, and biodegradable polymers such as PLGA. For example, $CO_2$ can be used as a processing aid for PLGA at room temperature (or lower temperature) and lower pressures (<0.5 MPa). Under such conditions, PLGA containing biomolecules can be processed or bonded without applying heat or organic solvents. This technique can be applied to other polymers, such as PS and PMMA, although the processing temperature and pressure may vary from case to case.

Although carbon dioxide is the most desirable choice for gas-assisted processing and bonding, other gases including, but not limited to, methane, ethane, water, nitrogen, oxygen, chlorofluorocarbon (CFC), or combinations thereof may also be used if desired. For example, methane and ethane work much better than carbon dioxide for polyolefins such as polyethylene and polypropylene.

Nano-sized or micron-sized particles may be used to provide dimensional stability for the polymer. For example, when a small amount of nanoparticles such as organoclay is added to the PLGA, dimension integrity can be maintained very well in the bonding process.

Carbon dioxide has been used to bond micro- and nano-patterned polymer layers for the fabrication of 3D tissue scaffolds. The same technique can be used for the bonding and assembly of biochips/biosensors, drug delivery devices, and any polymer based microelectromechanical systems (MEMS)/nanoelectromechanical systems (NEMS) devices.

EXAMPLE 1

$CO_2$-Enhanced 3D Assembly of Polymer Microstructure

An array of wells 5 μm in diameter and 3.9 μm in height was fabricated on the PLGA nanocomposite via photolithography and microembossing. The PLGA nanocomposite was prepared by mixing PLGA with organoclay (Cloisite 30B from Southern Clay Products, Inc.) (95/5 wt. %) at 120° C. and 150 rpm for 5 minutes using a microcompounder (DACA Instruments). During $CO_2$-enhanced assembly at the microscale, only the PLGA nanocomposite was used. For simplicity, PLGA refers to the PLGA nanocomposite unless otherwise indicated.

The pattern was first generated on a photosensitive PMMA coated on a Si wafer by conventional photolithography. Then, the mixture of poly(dimethylsiloxane) (PDMS) resin and curing agent (SYLGARD 184 from Dow Corning) was poured onto the patterned mold. After 4 hours of curing at 60° C., the PDMS mold with inverse pattern was peeled off. The PLGA thin film (~100 μm) was prepared by compression molding. The film was set at 140° C. for 1 minute, and a pressure of 0.07 MPa was used to emboss the PDMS mold into the molten PLGA film. After 1.5 minutes, ice water was used to cool down the system. When the temperature was below 38° C., the patterned PLGA layer was peeled off from the PDMS mold. The total operation time was 2.5 minutes.

FIG. 1 represents the typical case of $CO_2$ bonding of PLGA microstructures. FIGS. 1A and 1B show the top view and side view of the patterned PLGA layer. Each of the micro-wells has a diameter of 5 μm and a height of 3.9 μm. Multiple layers of patterned PLGA were stacked to form a laminated assembly. A contact pressure of 0.06 MPa was exerted on the assembly, which ensured good contact between the PLGA layers. The assembly was placed in the pressure vessel, and saturated with $CO_2$ at 35° C. and 0.79 MPa for 4 hours, after which the pressure was quickly released. The result was a multi-layer assembly bonded into a single piece. The cross-section profile of the bonded layers was inspected using SEM, and the bonding interface was invisible, as shown in FIG. 1C. The original height of the wells was 3.9 μm, while the height after bonding was 3.95 μm. The well diameter remained 5 μm after bonding. Thus, the microstructures were retained. When the $CO_2$ pressure increased to 2.17 MPa with other parameters maintained constant, the micro-wells shrank because of foaming, as shown in FIG. 1D.

The cross-section profiles of bonded layers were measured using a Hitachi S-3000H scanning electron microscope (SEM). The PLGA samples were frozen in liquid nitrogen for 20 minutes and cut through the bonded layers using a microtome knife, which was frozen at the same condition as the samples. The PLGA samples (without fracture) were sputter-coated with gold at an argon pressure of 14 Pa for 30 seconds at a current of 7 mA. This step was repeated 6 times over 60-second intervals to prevent the samples from overheating.

Figure 2A:
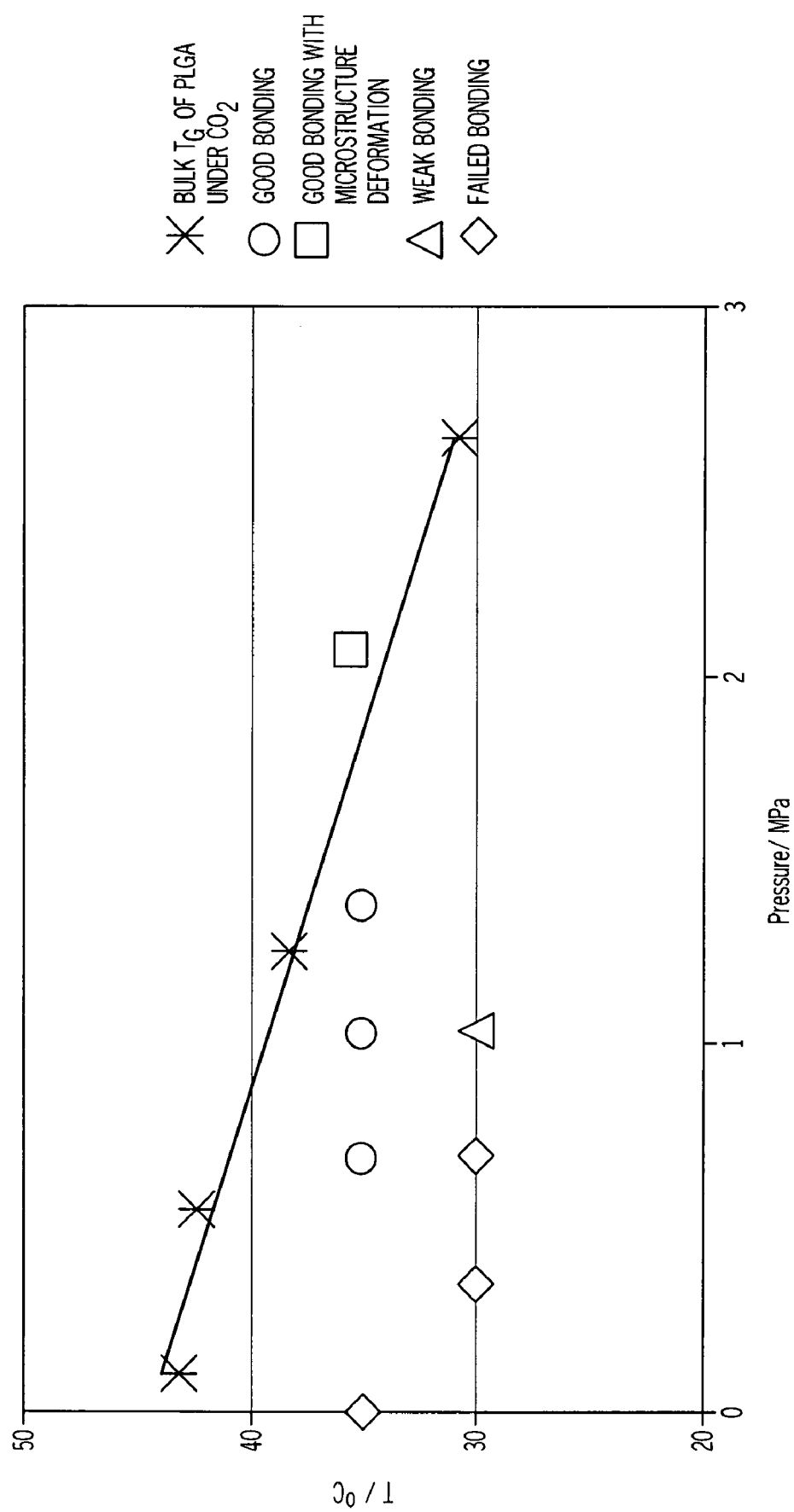
FIG. 2A is a graph showing the relationship between the $T_g$ data of PLGA and $CO_2$ bonding performance.

FIG. 2A shows the relationship between $CO_2$ bonding performance and the $T_g$ of PLGA. The $T_g$ of PLGA under $CO_2$ was determined using a differential scanning calorimeter (DSC2920, TA) equipped with a high-pressure cell, using the heating rate of 10 K min$^{-1}$. The asterisk indicates the bulk $T_g$ of PLGA under $CO_2$ pressures. The solid line represents the regression line of these bulk $T_g$. Circles indicate good bonding; squares, good bonding with microstructure deformation; triangles, weak bonding; and diamonds, failed bonding.

Figure 2B:
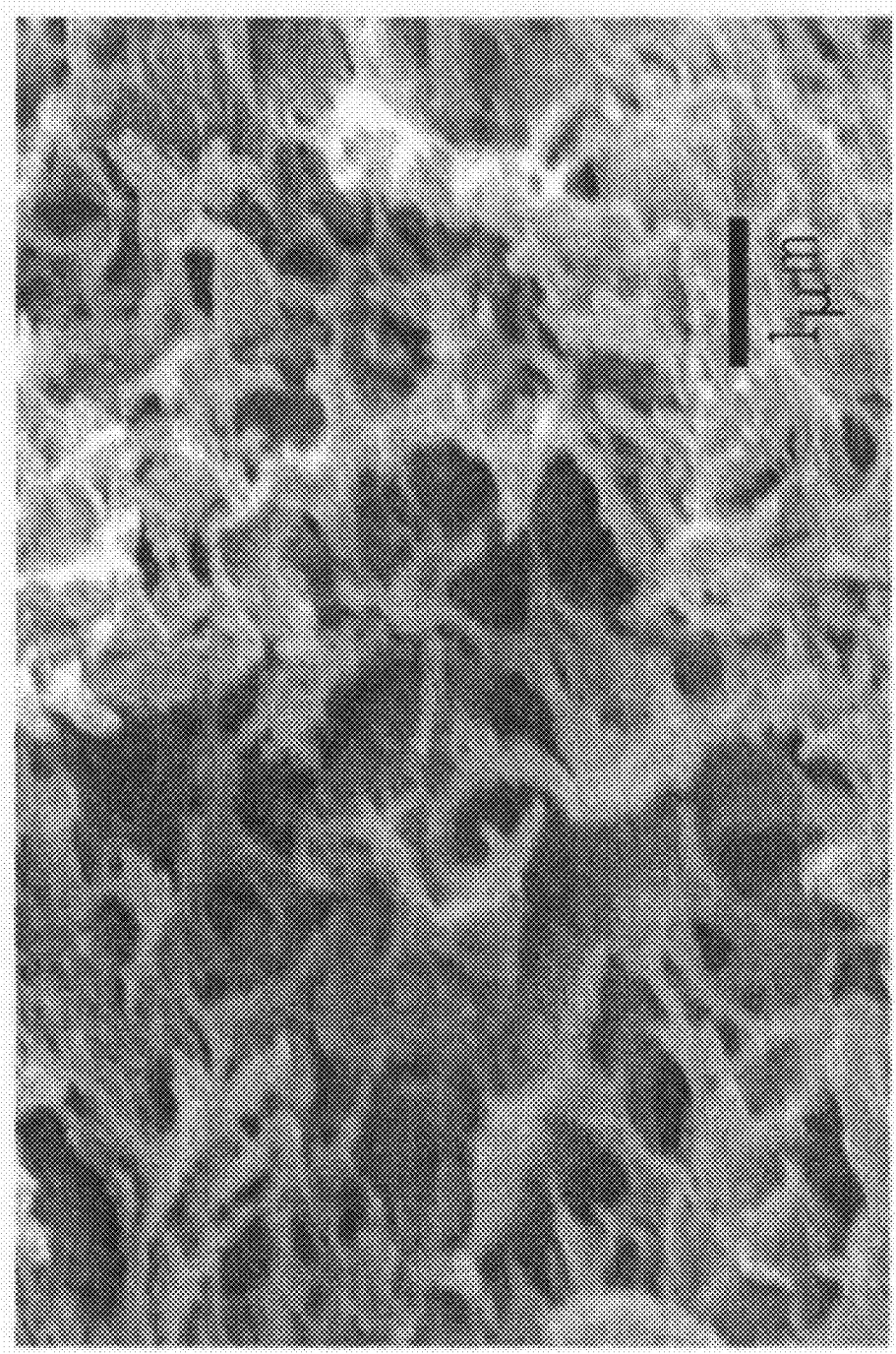
FIG. 2B is an SEM micrograph showing the presence of a porous structure of with submicron-sized cells which was formed within the substrate.

The best bonding performance occurred when the $T_B$ was slightly lower than the bulk $T_g$: good bonding was achieved, and the surface microstructures maintained their integrity. For example, good bonding was achieved at 35° C. and 0.79 MPa for 4 hours. When the $T_B$ was far below the bulk $T_g$, there was no bond strength. There was no bonding in the absence of $CO_2$ when other parameters remained the same, even after 24 hours. When the $T_B$ was higher than the bulk $T_g$, visible deformation of microstructures was observed. For example, when the $CO_2$ pressure was 2.17 MPa, the bulk $T_g$ of PLGA (34° C.) was below the bonding temperature of 35° C. SEM observation revealed that a porous structure with submicron-sized cells was formed within the substrate (FIG. 2B), resulting in deformation of the micro-wells. $CO_2$ enhanced chain motion at the polymer surface causes the completion of the interface bonding. At points far below the bulk $T_g$, the motion of macromolecular segments enhanced by $CO_2$ at the surface is not sufficient to realize effective bonding. When the $T_B$ is above the bulk $T_g$, the segments of macromolecular chains, both near the surface and in the bulk, can move, causing microstructure deformation.

To avoid foaming-caused microstructure deformation, the bonding temperature should be slightly lower than the bulk $T_g$.

EXAMPLE 2

$CO_2$-Enhanced 3D Assembly of Polymer Nanostructure

Nano-sized channels with a spectrum of widths from 100 nm to 600 nm were patterned on a negative tone resist AZPN114 coated on a Si wafer using electron beam lithography (EBL). The PDMS mold with inverse nano-sized pattern was obtained by following the procedure described above, except that the PDMS mixture was cured for 24 hours at room temperature. A PS film (~50 μm, prepared by compression molding) was set at 220° C. for 1 minute, and a pressure of 0.1 MPa was used to emboss the PDMS mold into the molten PS film. After 30 s, ice water was used to cool down the system. When the temperature was below 40° C., the PS nanochannels were obtained by peeling off from the PDMS mold. The total operation time was 1.5 minutes. Another PS film (~2 μm) was generated as the lid by spin-coating 5 wt. % PS toluene solution on a pre-cleaned glass slide. The films with the slides were floated onto a pool of deionized water and captured on a cured PDMS plate. The films with the PDMS plate were then dried in a vacuum for 24 h at 90° C. to remove residual water.

The PS lid on the PDMS plate was aligned onto the patterned PS layer. The aligned sample was placed between two glass slides, and a contact pressure was applied on the sample. The whole assembly was placed in the pressure vessel for $CO_2$ bonding as described above.

At the nanoscale, the surface roughness is comparable to the nano-sized features. In order to obtain the desired intimate contact between the lid and the nanochannels, the PS lid was transferred onto a PDMS plate and pressed into intimate contact with the top surface of the nanochannels. Intimate contact could be obtained because of the elastomeric nature of PDMS. A contact pressure of 0.28 MPa achieved good interfacial wetting without deforming the nanostructure.

The cross-section profiles of bonded layers were measured using a Hitachi S-3000H SEM. The PS samples were frozen in liquid nitrogen for 20 minutes and the lid was broken using tweezers in a liquid nitrogen environment. The PS samples (without fracture) were sputter-coated with gold at an argon pressure of 14 Pa for 30 seconds at a current of 7 mA. This step was repeated 6 times over 60-second intervals to prevent the samples from overheating.

Figure 3A:
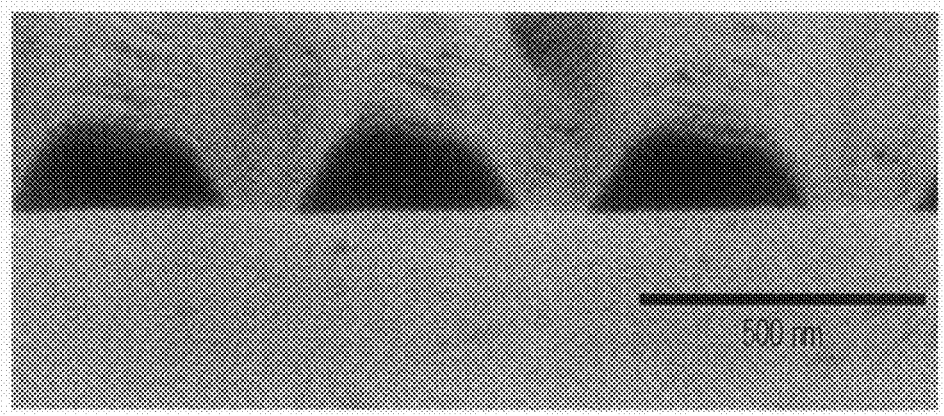
FIG. 3 is SEM micrographs showing PS nanochannels (A) before and (B) after $CO_2$ bonding at 70° C. and 1.38 MPa $CO_2$ pressure.
Figure 3B:
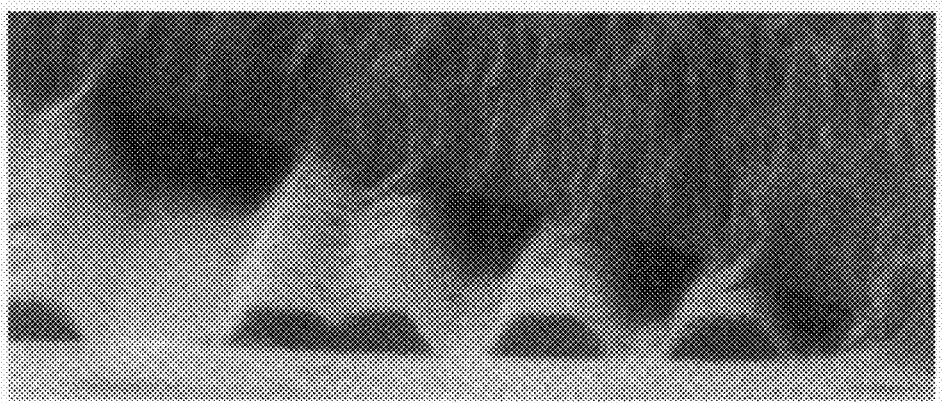

FIG. 3 shows the SEM micrographs of PS nanochannels before (A) and after (B) bonding at 70° C., 1.48 MPa $CO_2$ pressure. Compared with PS nanochannels before bonding, the nanostructures, including surface roughness, were well preserved after $CO_2$ bonding. The bonding temperature of 70° C. is 26° C. below the bulk $T_g$ of PS (96° C.) under 1.48 MPa $CO_2$ pressure.

EXAMPLE 3

Figure 4:
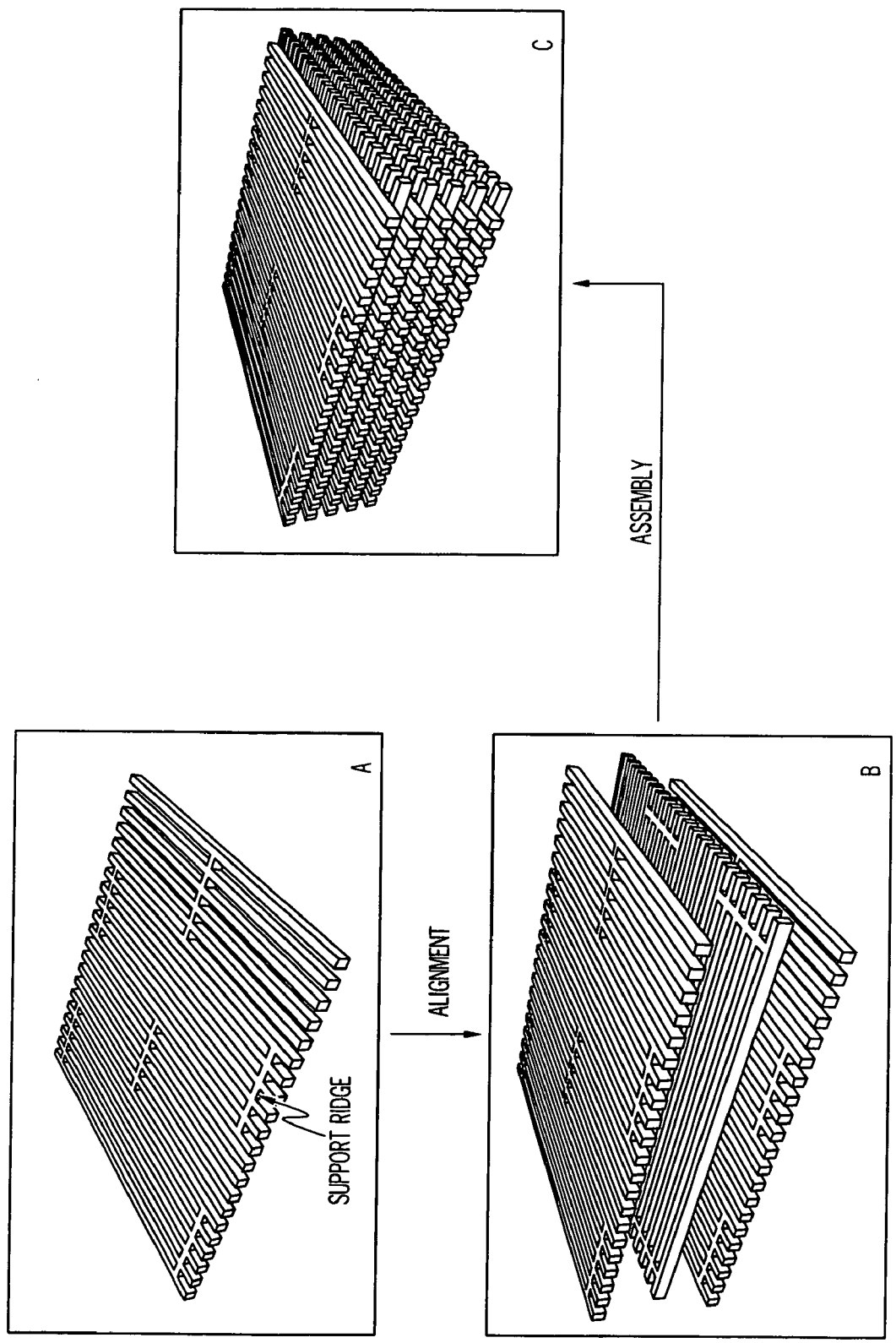
FIG. 4 is a schematic showing the process of assembling a 3D tissue scaffold from microfabricated planar skeletons.

Generally, the process to fabricate the well-defined 3D scaffold involves three stages: 1) photolithography to generate the mold with the planar skeletal structure; 2) microembossing to fabricate 2D scaffold skeletons with the planar structure transferred from the mold; and 3) $CO_2$ bonding to assemble the laminated multiple 2D skeletons into 3D tissue scaffolds. FIG. 4 shows the design concept and the process to assemble single-layer scaffold skeletons into multiple layers of the 3D architecture with a prescribed pore structure.

The skeletal structure was generated via photolithography and microembossing. Photolithography involved photomask fabrication, wafer cleaning, spin coating of the photoresist, soft baking, UV-exposure, post-exposure baking, and developing. To make the photomask, FreeHand (a computer-aided design software) was used to create the micropattern, which was then printed as transparent lines (60 μm in width with 120 μm in spacing between two parallel lines) on a black background on a transparency using a high-resolution laser printer (3386 dpi). A silicon wafer, which was pretreated with isopropyl alcohol, rinsed with deionized water and then dehydrated, was spin-coated with a thin film (60 μm in thickness) of an epoxy photoresist (SU-8 100 from MicroChem Corp.) using a spin coater (Model P6700 from Specially Coating Systems Inc.). This was followed by soft baking for 8 minutes at 65° C., and then hard baking for 25 minutes at 95° C. The SU-8 layer was exposed to the UV light (350-400 nm) on a Cobalt mask aligner. After exposure and post-exposure-baking, the SU-8 layer on the wafer was immersed in the SU-8 developer to produce the SU-8 mold with all the skeletal features.

The mixture of poly(dimethylsiloxane) (PDMS) resin and curing agent (SYLGARD 184 kit, Dow Corning) in a 10:1.05 w/w ratio was poured onto the SU-8 mold. After curing for 2 h at 65° C., an inverse PDMS mold was peeled off from the SU-8 mold.

Figure 5:
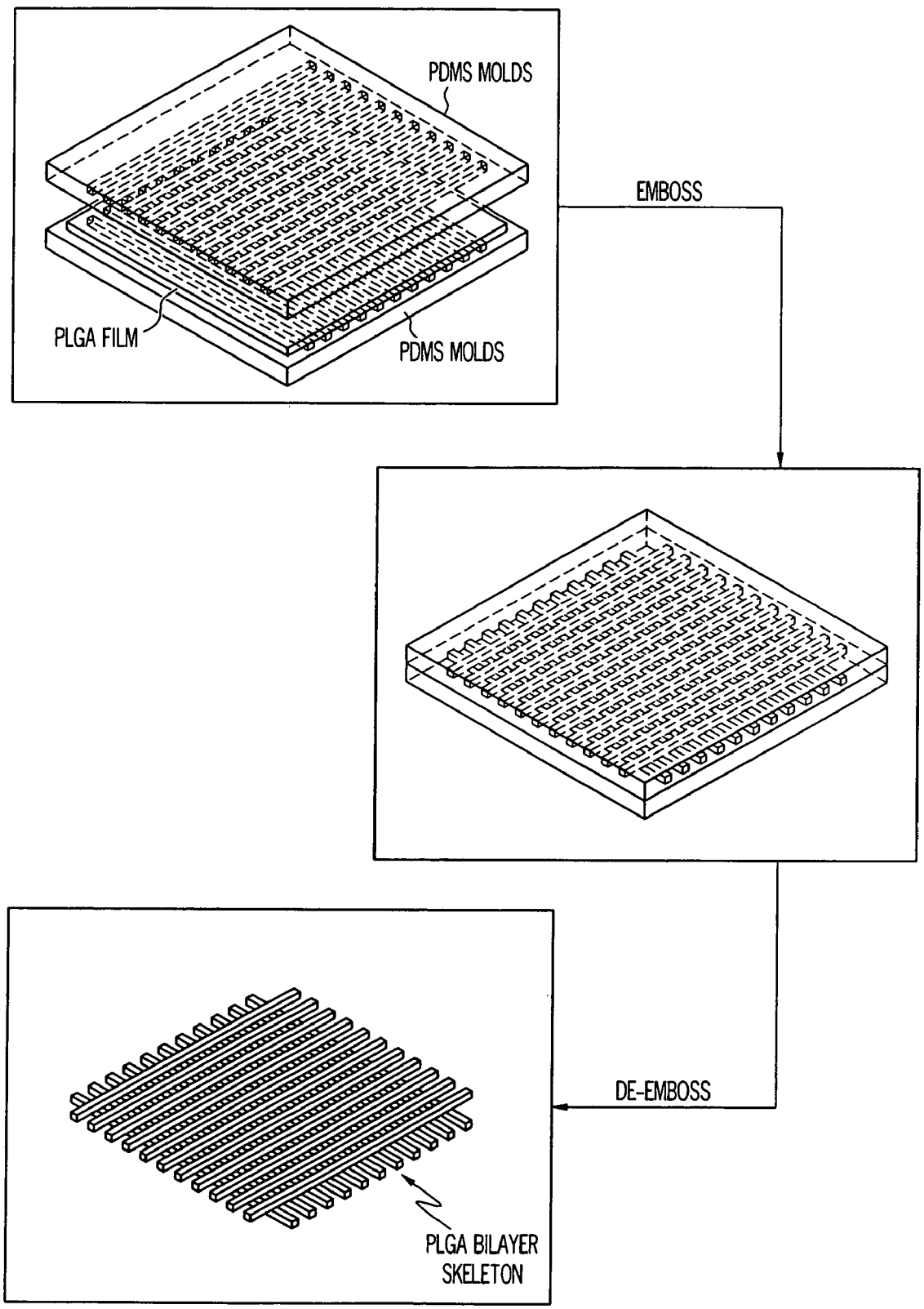
FIG. 5 is a schematic showing the process of bilayer embossing.

The bilayer microembossing process (FIG. 5) was developed to produce scaffolds with open channels. The PLGA thin film (~100 μm) was prepared via compression molding. A PDMS mold with a PLGA film on the top was set at a temperature higher than 140° C. for 1 min, and a pressure of 0.5 MPa was applied to press another PDMS mold face-down into the molten PLGA film in an orthogonal orientation to the former PDMS mold. After 1.5 min holding, ice water was used to cool down the system. When the temperature was below 38° C., the PLGA bilayer was peeled off from the PDMS molds. The total operation time was 2.5 min.

Multiple PLGA scaffold skeletons were stacked in an orthogonal orientation and placed between two glass slides. A contact pressure of 0.06 MPa was applied by exerting predetermined weight on the assembly. At 35° C., an ISCO 500 C high-pressure syringe pump was used to deliver and control the $CO_2$ pressure at 0.79 MPa in a pressure vessel. After saturation with $CO_2$ for 1 h, the pressure was quickly released, and the bonded assembly was taken out from the vessel. To evaluate the bonding performance, the bonded skeletons were frozen in liquid nitrogen for 20 minutes and cut through the bonded layers using a microtome blade, which was kept at the same freezing temperature as that of the samples. The cross section cut-through samples were observed under a scanning electron microscope.

Figure 6A:
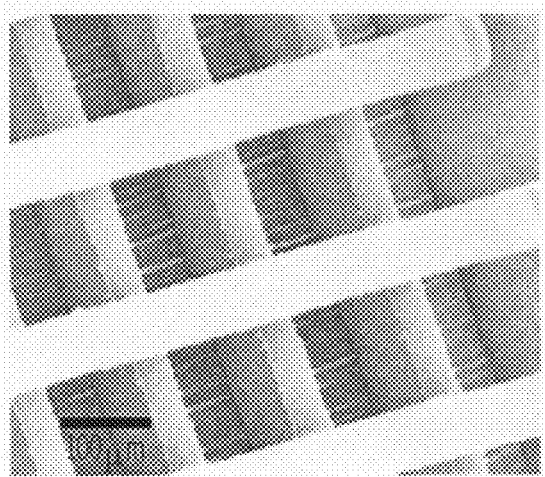
FIG. 6A is an SEM micrograph of a top view of a PLGA skeletal layer.
Figure 6B:
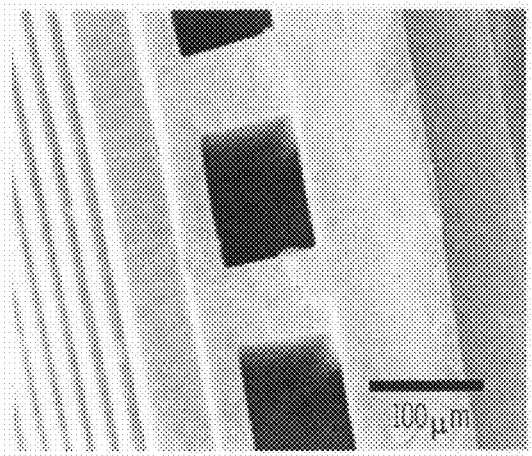
FIG. 6B is an SEM micrograph of a cross-section of bonded PLGA skeletal layers.
Figure 6C:
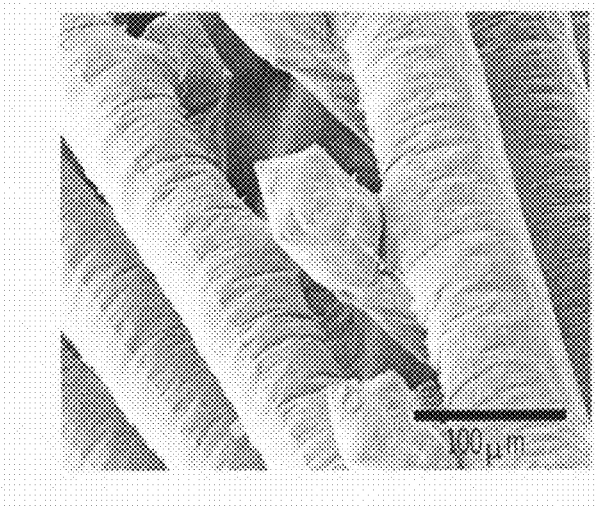
FIG. 6C is an SEM micrograph of bonded pure PLGA skeletal layers.
Figure 7:
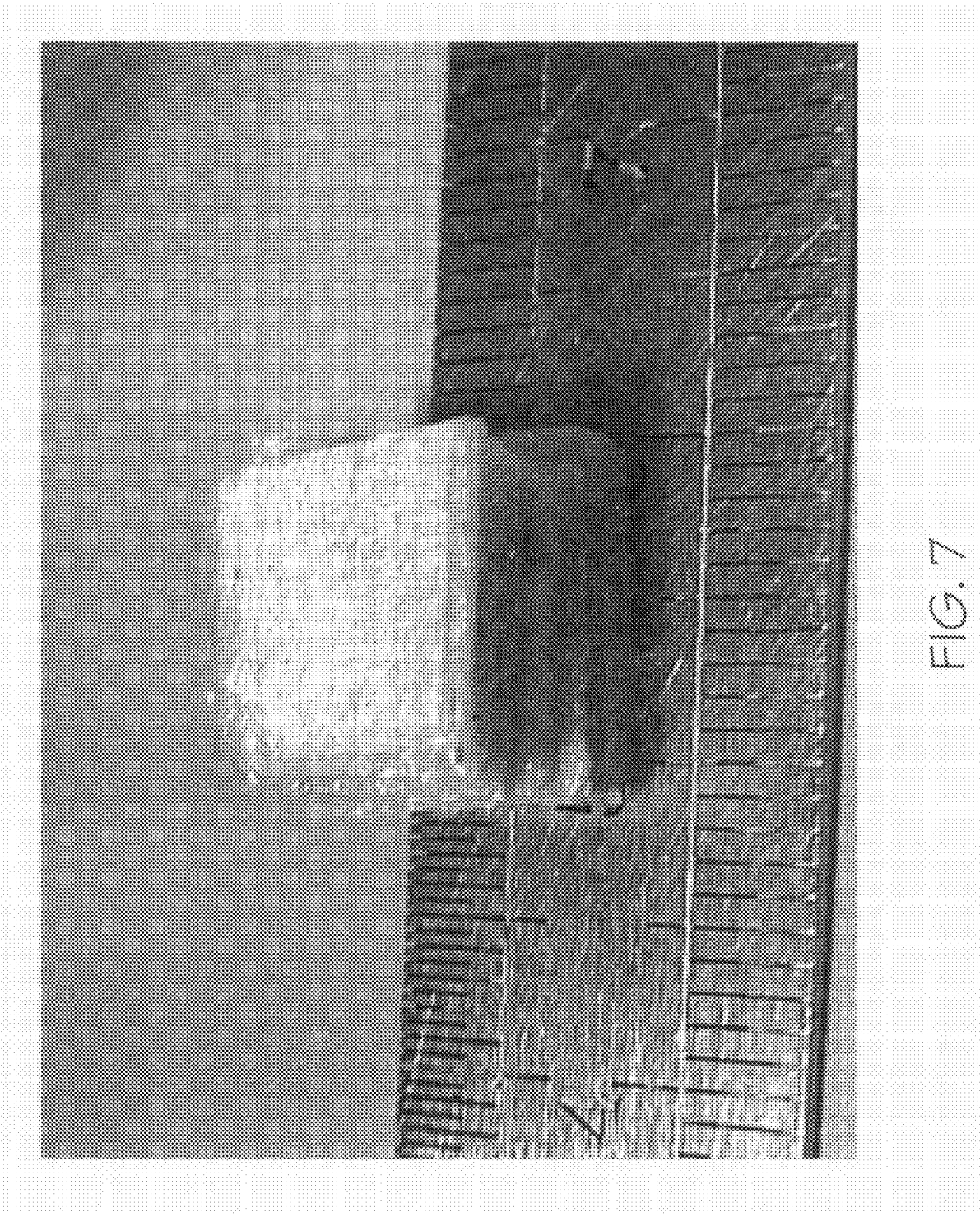
FIG. 7 is a photograph of a 3D scaffold.

FIG. 6A shows the top view of a PLGA bilayer skeletal scaffold. The cross-section profile of the bonded layers was inspected using SEM as shown in FIG. 6B. The lamination was bonded seamlessly, and excellent microstructure preservation was obtained. When pure PLGA was used, obvious deformation of microstructures was observed. The original rectangular shape of the ridge was lost after bonding (FIG. 6C). The presence of the nanoscale clay particles improved the dimensional stability, which may be due to the formation of a percolated network structure resulting from randomly oriented nanoscale clay particles. FIG. 7 shows a large scaffold consisting of 320 layers of skeletons, each layer having the dimensions of 10 mm×10 mm×60 μm.

A novel $CO_2$ bonding technique was developed for 3D assembly of polymer micro-/nanostructures at low temperatures. Precise replication at a scale as small as 10 nm was achieved by embossing PDMS molds into molten polymer substrate. Bilayer embossing technique is likely to be commercially viable for continuously manufacturing scaffold skeletons by applying roller hot embossing. The $CO_2$ bonding technique was demonstrated to be a powerful method to assemble 3D polymer scaffolds at low temperatures. More importantly, there is no organic solvent involved throughout the whole process from pattern design to the final 3D scaffold. This new micro-/nanofabrication process provides a low-cost, fast, solvent-free method to construct 3D scaffolds with predefined structure, and should be viable for commercial application.

EXAMPLE 5

The lap-shear measurements were conducted according to ASTM 3163(01) at a crosshead speed of 0.5 mm/min with the modified joint geometry. The specimen dimension was 0.55 mm thickness, 12.7 mm width, and 50 mm length. The overlapped area was 6.4×12.7 mm². The distance between the jaws was 68.2 mm, with the joint located in the middle.

The bond strength between PLGA layers was over 1 MPa after 4 h at 35° C. (below body temperature) under 0.79 MPa $CO_2$ pressure, as determined by the lap-shear measurement (during the lap-shear measurements, the PLGA specimens yielded before any de-bonding in the overlap area, indicating a bond strength higher than 1 MPa, the yield stress of PLGA). Without the presence of $CO_2$ pressure, there was no bond strength observed at 35° C., even after 24 h. In addition, the lap-shear measurements were conducted on the $CO_2$-bonded samples after different bonding times, i.e., 10, 30, 60, 90, 120, and 240 min, when other parameters were maintained as constants. It was found that there was bond strength developing after a bonding time of 10 min. The bond strength approached 1 MPa after 0.5 h. This bond strength was strong enough to maintain the 3D structure. Even after being used to culture cells in liquid media for four days, the scaffold still maintained its structural integrity.

TABLE 1

Comparison of bond strength from lap-shear measurements

| | $T_B$ [° C.] | $P_B$ [MPa] | $P_C$ [MPa] | $t_B$ [hrs] | Bond Strength [MPa] |
|---|---|---|---|---|---|
| PLGA/PLGA | 35 | 0.69 | 0.06 | 4 | >1.00 ± 0.05 |
| PMMA/pure PLGA/PMMA | 35 | 0.69 | 0.06 | 4 | 0.32 ± 0.08 |
| PS/pure PLGA/PS | 35 | 0.69 | 0.06 | 4 | 0.30 ± 0.04 |
| PS/PS [a] | 62 | N/A [b] | 0.8 | 4 | 0.08 ± 0.03 |
| PPO/PPO [a] | 90 | N/A [b] | 0.8 | 4 | 0.03 ± 0.01 |

[a] The bond strength for PS/PS and PPO/PPO are literature values.
[b] No $CO_2$ was applied.

Figure 8:
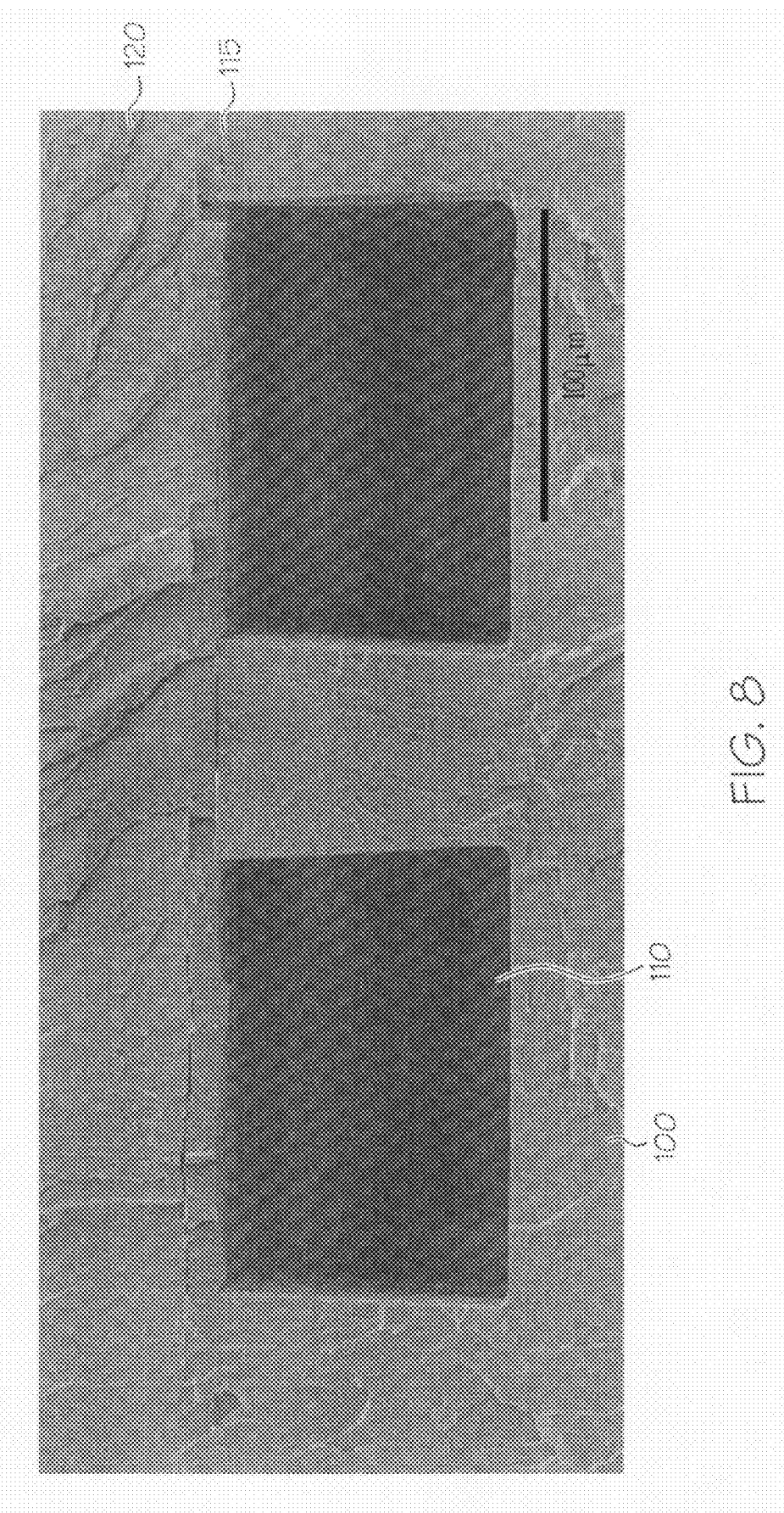
FIG. 8 is an SEM micrograph of the cross-section of sealed microchannels on a PS substrate using pure PLGA as the interlayer.

Bonding other thermoplastics, such as PS, PMMA, and polycarbonate, can be achieved at higher bonding temperature and $CO_2$ pressure. For instance, a good bonding of PS/PS was achieved at 50° C. and 3.4 MPa $CO_2$ pressure. If pure PLGA is used as an interlayer, PMMA/PMMA and PS/PS bonding can be achieved at the same conditions as for bonding of materials similar to PLGA (i.e., 35° C. and 0.69 MPa $CO_2$ pressure). The bond strength is up to 0.32 MPa for PMMA and 0.30 MPa for PS as shown in Table 1. This provides a way to seal microfluidic biochips below body temperature. FIG. 8 shows a cross-section of sealed microchannels 110 on a PS substrate 100 using pure PLGA thin film 115 as an interlayer to join the PS lid 120 and PS microchannels 110.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of bonding materials comprising:
providing a polymer;
providing a second material;
placing the polymer and the second material in a pressure vessel;
contacting the polymer and the second material at a low contact pressure in the absence of a solvent or an adhesive;
maintaining the polymer at a temperature less than a bulk Tg of the polymer;
introducing a gas at low pressure into the pressure vessel to the contacted polymer and second material in the absence of a solvent or an adhesive thereby pressurizing the pressure vessel;
bonding the contacted polymer and the second material in the pressure vessel in the presence of the gas at low pressure and in the absence of a solvent or an adhesive, while maintaining the polymer at the temperature less than the bulk Tg of the polymer;
releasing the gas pressure in the pressure vessel; and
removing the bonded polymer and second material from the pressure vessel.

2. The method of claim 1 wherein the gas is a compressed gas.

3. The method of claim 1 wherein the gas is selected from carbon dioxide, methane, ethane, water, nitrogen, oxygen, chlorofluorocarbon, or combinations thereof.

4. The method of claim 1 wherein introducing the gas at low pressure comprises introducing the gas at a pressure less than about 10 MPa.

5. The method of claim 1 wherein the low contact pressure is less than about 1 MPa.

6. The method of claim 1 wherein the polymer or the second material includes nanosize or micronsize features, and wherein the nanosize or micronsize features are retained after bonding.

7. The method of claim 1 wherein a time for bonding is less than about 4 hrs.

8. The method of claim 7 wherein the time for bonding is less than about 2 hrs.

9. The method of claim 8 wherein the time for bonding is less than about 1 hr.

10. The method of claim 1 wherein the polymer and second material are maintained at a temperature less than about 70° C.

11. The method of claim 1 wherein the polymer and second material are maintained at a temperature less than about 50° C.

12. The method of claim 1 wherein the polymer and second material are maintained at a temperature less than about 35° C.

13. The method of claim 1 wherein the second material is selected from polymers, or non-polymers.

14. The method of claim 13 wherein the second material is the non-polymer selected from metals, silicon, silicon oxide, or combinations thereof.

15. The method of claim 1 wherein the polymer is selected from poly(DL-lactide-co-glycolide), polystyrene, polymethyl methacrylate, polycarbonate, polyolefins, polylactic acid, or combinations thereof.

16. The method of claim 1 wherein the second material is selected from poly(DL-lactide-co-glycolide), polystyrene, polymethyl methacrylate, polycarbonate, polyolefins, polylactic acid, or combinations thereof.

17. A method of bonding materials comprising:
providing a polymer;
providing a second material, wherein the polymer, the second material, or both includes nanosize or micronsize features;
placing the polymer and the second material in a pressure vessel;
contacting the polymer and the second material at a contact pressure less than about 1 MPa in the absence of a solvent or an adhesive;
maintaining the polymer and second material at a temperature less than a bulk Tg of the polymer;
introducing a compressed gas at a pressure less than 10 MPa into the pressure vessel to the contacted polymer and second material in the absence of a solvent or an adhesive thereby pressurizing the pressure vessel;
bonding the contacted polymer and the second material in the pressure vessel in the presence of the gas at low pressure and in the absence of a solvent or an adhesive, while maintaining the polymer at a temperature less than a bulk Tg of the polymer, wherein the nanosize or micronsize features are retained after bonding;
releasing the gas pressure in the pressure vessel; and
removing the bonded polymer and second material from the pressure vessel.

* * * * *